United States Patent [19]
Young

[11] Patent Number: 4,541,397
[45] Date of Patent: * Sep. 17, 1985

[54] GASEOUS FUEL CARBURETION SYSTEM

[75] Inventor: Colin G. Young, Mississauga, Canada

[73] Assignee: Emco Wheaton (International) Limited, Toronto, Canada

[ * ] Notice: The portion of the term of this patent subsequent to May 22, 2001 has been disclaimed.

[21] Appl. No.: 605,278

[22] Filed: Apr. 30, 1984

Related U.S. Application Data

[63] Continuation of Ser. No. 371,469, Apr. 23, 1982, Pat. No. 4,449,509.

[51] Int. Cl.$^4$ ............................................. F02B 43/00
[52] U.S. Cl. .................. 123/527; 123/27 GE; 123/577; 123/525; 48/180 P
[58] Field of Search .................. 123/527, 525, 27 GE, 123/577; 48/180.1, 189.1

[56] References Cited

U.S. PATENT DOCUMENTS

| | | | |
|---|---|---|---|
| 1,932,370 | 10/1933 | Heinish | 123/527 |
| 3,540,419 | 11/1970 | Fox | 123/27 GE |
| 3,960,126 | 6/1976 | Shinoda | 123/527 |
| 4,063,905 | 12/1977 | Johnson et al. | 123/527 |
| 4,141,326 | 2/1979 | Wolber | 123/DIG. 12 |
| 4,149,562 | 4/1979 | Johnson | 261/44 A |
| 4,227,497 | 10/1980 | Mathieson | 123/525 |
| 4,308,843 | 1/1982 | Garretson | 123/527 |
| 4,364,364 | 12/1982 | Subramaniam | 123/527 |

FOREIGN PATENT DOCUMENTS 1370619  4/1974  United Kingdom .......... 123/27 GE

*Primary Examiner*—E. Rollins Cross
*Attorney, Agent, or Firm*—Fetherstonhaugh & Co.

[57] ABSTRACT

In a gaseous fuel carburetion system in which air and gaseous fuel are mixed in a mixer prior to induction into an internal combustion engine, and in which the rate of flow of the induction air is controlled by throttling the intake of the air/fuel mixture, and in which gaseous fuel is supplied to the system from a pressurized source, an improved method and apparatus for regulating the supply of gaseous fuel to the air/fuel mixer is provided. The method comprises the steps of; sensing at least one operating parameter of the engine which is a function of the induction air flow rate and generating a control signal which varies in response to changes in the induction air flow rate, controlling the rate of flow of the gaseous fuel from the source to the mixer by means of said control signal whereby the rate of flow of the gaseous fuel varies in response to the sensed changes in the parameters related to the air flow rate. The apparatus comprises; mixer means arranged to receive and mix the induction air and the gaseous fuel supply and to deliver the mixture to the engine, sensing means for monitoring at least one operating parameter of the engine which is a function of the induction air flow rate and generating a control signal which varies in response to changes in the induction air flow rate, flow control means adapted to control the rate of flow of the gaseous fuel from the source to the mixer whereby the rate of flow of the gaseous fuel varies in response to the sensed changes in the parameters related to the air flow rate.

6 Claims, 4 Drawing Figures

GASEOUS FUEL CARBURETION SYSTEM

RELATED APPLICATIONS

This application is a continuation of application Ser. No. 371,469 filed Apr. 23, 1982, now U.S. Pat. No. 4,449,509.

FIELD OF INVENTION

This invention relates to a method and apparatus for supplying a gaseous fuel/air mixture to an associated internal combustion engine.

PRIOR ART

In prior gaseous fuel carburetion systems the fuel is supplied to the mixing device at a pressure slightly below atmospheric pressure, the mixer utilizing the flow of the induction air to create a depression to induce flow of the gaseous fuel into the mixer.

When such a prior system has been used to modify an existing engine having a carburetion system for liquid fuel such as gasoline, it has been customary to replace the original air cleaner with a manifold, mixer and a new air cleaner or alternatively modify the gasoline carburetor by adding a venturi device. Many different manifolds are required for the various types of engines used in vehicles due to hood clearance problems. Performance and economy of converted vehicles when running on gasoline are often impaired and the modification frequently upsets the exhaust emission levels necessitating rectification and possible vehicle modifications to obtain statutory approval.

I have found that it is possible to provide a gaseous fuel carburetion system which is suitable for the conversion of gasoline driven vehicle engines and which does not affect the performance, economy or emissions of the converted engine when it is running on gasoline and does not require the original air cleaner to be replaced.

I have further found that the flow of gaseous fuel to the mixer may be effectively controlled by regulating it in response to changes in the air induction flow rate.

My method of regulating the supply of gaseous fuel provides gaseous fuel carburetion for an internal combustion engine. The method includes mixing the gaseous fuel with air and supplying the mixture to the engine, sensing at least one operating parameter of the engine related to the induction air flow rate, supplying gaseous fuel at a greater pressure than the incoming air and controlling the rate of flow of the incoming gaseous fuel in response to sensed changes in the parameters related to the air flow rate.

SUMMARY OF INVENTION

According to one aspect of the present invention there is provided in a gaseous fuel carburetion system in which air and gaseous fuel are mixed in a mixer prior to induction into an internal combustion engine, and in which the rate of flow of the induction air is controlled by throttling the intake of the air/fuel mixture, and in which gaseous fuel is supplied to the system from a pressurized source, an improved method of regulating the supply of gaseous fuel to the air/fuel mixer comprising the steps of; sensing at least one operating parameter of the engine which is a function of the induction air flow rate and generating a control signal which varies in response to changes in the induction air flow rate, controlling the rate of flow of the gaseous fuel from the source to the mixer by means of said control signal whereby the rate of flow of the gaseous fuel varies in response to the sensed changes in the parameters related to the air flow rate.

According to a further aspect of the present invention, there is provided in a gaseous fuel carburetion system in which air and gaseous fuel are mixed in a mixer prior to induction into an internal combustion engine, and in which the rate of flow of the induction air is controlled by throttling the intake of the air/fuel mixture, and in which gaseous fuel is supplied to the system from a pressurized source, an improved method of regulating the supply of gaseous fuel to the air/fuel mixer comprising the steps of regulating the pressure of the gaseous fuel supply to a predetermined pressure above the induction air pressure thereby to provide a positive pressure gaseous fuel supply, sensing at least one operating parameter of the engine which is a function of the induction air flow rate and generating a control signal which varies in response to changes in the induction air flow rate, controlling the rate of flow of the gaseous fuel from the source to the mixer by means of said control signal whereby the rate of flow of the gaseous fuel varies in response to the sensed changes in the parameters related to the air flow rate.

According to yet another aspect of the present invention there is provided in a gaseous fuel carburetion system in which a mixture of air and gaseous is inducted into an internal combustion engine, and in which the rate of flow of the mixture, and thus the air, is controlled by throttling the intake of the mixture, the improvement of mixer means arranged to receive and mixe the induction air and the gaseous fuel supply and to deliver the mixture to the engine, regulator means in the gaseous fuel supply line for supplying gaseous fuel to the system at a pressure above that of the induction air supply, thereby to provide a positive pressure gaseous fuel supply, sensing means for monitoring at least one operating parameter of the engine which is a function of the induction air flow rate and generating a control signal which varies in response to changes in the induction air flow rate, flow control means adapted to control the rate of flow of the gaseous fuel from the source to the mixture whereby the rate of flow of the gaseous fuel varies in response to the sensed changes in the parameters related to the air flow rate.

The invention will be more clearly understood after reference to the following detailed specification read in conjunction with the drawings wherein.

Figure 1:
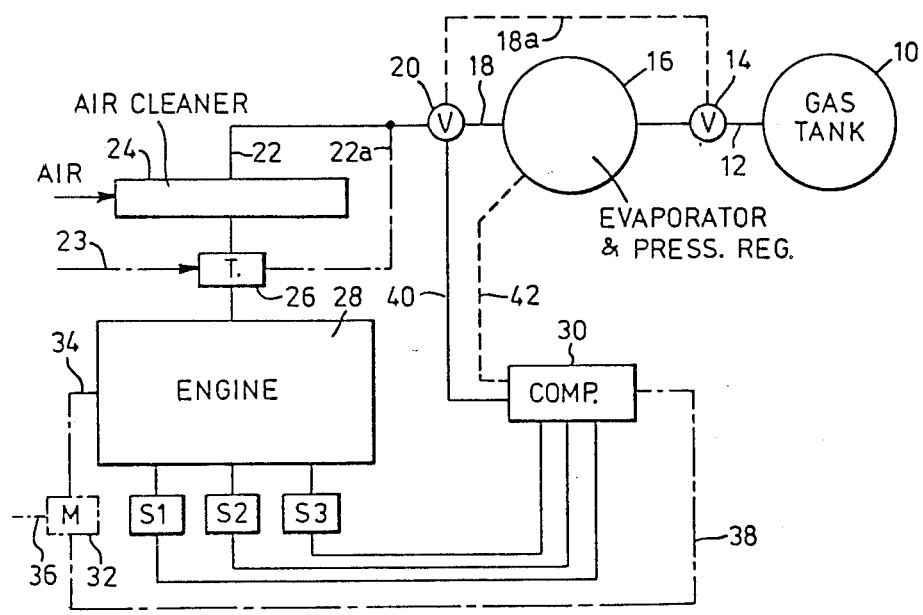
FIG. 1 is a diagrammatic illustration of a gaseous fuel carburetion system in accordance with an embodiment of the present invention.

With reference to FIG. 1 of the drawings the reference number 10 refers to a gas storage tank. The gas storage tank is used to store the fuel which may be in the form of methane, ethane, propane or butane, commonly known as natural gas, or liquified petroleum gas (LPG). The gas is discharged from the gas tank through a conduit 12 in which a shut-off valve 14 is provided. An evaporator and pressure regulator 16 is located in the gaseous fuel supply line 18 and serves to supply gaseous fuel to the system at a pressure above that of the induction air supply thereby to provide a positive pressure gaseous fuel supply. A flow control valve 20 receives the gaseous fuel from the line 18 and controls the flow of gaseous fuel to the line 22. The air cleaner 24 acts as a mixer which receives gaseous fuel from the line 22 and induction air and serves to mix the gaseous fuel and induction air. The mixture of air and gaseous fuel is then transmitted through a throttle device 26 to the engine 28. A plurality of sensing devices S1, S2 and S3 are provided for sensing a number of operating parameters of the engine. The signals generated by the sensing devices S1, S2 and S3 are transmitted to a computer device 30. The computer device 30 is preferably in the form of a micro-processor suitably programmed so as to be operative to continuously calculate the air flow rate from the instantaneous values of the signals generated by one or more of the sensing devices S1, S2 and S3.

In addition to the sensing devices S1, S2 and S3 a monitoring device 32 may be provided. The monitoring device 32 may be connected to other engine parameters by way of line 34 and/or by way of line 36 to any other variable which may effect engine performance or engine fuel requirements. The monitor device 32 is connected to the computer 30 through lines 38. The computer 30 generates a signal which is transmitted to the control valve 20 through the line 40 and/or to the regulator 16 through the line 42. It will be apparent that it is possible to control the fuel flow by means of either a flow control valve 20 or the pressure regulator 16, in the preferred embodiment only the flow control valve 20 is regulated.

The gaseous fuel which is discharged from the evaporator passes to the flow control valve 20 and the flow of gaseous fuel from the flow control 20 is regulated by the output signal from the computer device 30 so that the gaseous fuel is admitted to the mixer 24 at the required flow rate. The gaseous fuel and air are mixed in the air cleaner and the mixture is withdrawn from the air cleaner and transmitted to the engine through a throttle device 26. Variations in the parameters relating to the air flow requirements of the engine are monitored by one or more of the sensing devices S1, S2 and S3. The signals from the sensing devices S1, S2 and S3 are computed to generate the control signal which controls the operation of the flow control valve 20.

Various modifications of the system diagrammatically illustrated in FIG. 1 of the drawings are possible. For example, the gaseous fuel may be transmitted directly through the line 22a to the throttle device 26 and similarly air may be transmitted directly to the throttle device through a line 23. In addition, the supply of gaseous fuel may be interrupted by closing the shut-off valve 14. Gasoline may then be admitted through the line 23 directly to the throttle device 26 which in this embodiment may be in the form of a conventional gasoline carburetor. Air may then be drawn directly through the air cleaner without mixing.

The present invention may operate by sensing only one engine parameter although it is preferable to sense more than one engine parameter and to compute the signals which are generated by the sensing devices in order to provide an output signal which is related to the air flow rate. The parameters of the engine which are sensed may be the air flow rate itself. However, in general it is very difficult to measure the induction air flow rate in most engines. However, the air flow rate can be calculated from the instantaneous values of the engine rotational speed and the induction manifold pressure or vacuum. Hence, preferably the parameters which are sensed by sensing devices S1, S2 are those relating to the engine induction manifold vacuum and the rotational speed of the engine. The sensing means S1 may be in the form of a vacuum sensing means associated with the engine induction manifold for sensing the instantaneous vacuum in the manifold. The vacuum sensing means may be operable either mechanically, pneumatically or electronically or by a combination of these modes. For example, the induction manifold may be in communication with the chamber which is provided with a pressure transducer operative to generate an electrical signal indicative of the pressure in the manifold. This electrical signal can then be used either directly or through the computer device 30 for the purposes of controlling the operation of the flow control valve 30 thereby controlling the rate of flow of the gaseous fuel. The sensing means preferably includes a second sensing means S2 which also serves to control the operation of the flow control valve 20. The sensing device S2 is provided for the purposes of sensing an engine parameter which is related to the rotational speed of the engine. The sensing device S2 may be mechanically, pneumatically or electronically operated or a combination thereof. For example, the sensing device S2 may be in the form of a centrifugal device that moves in response to changes in the rotational speed of the engine and the movement of the centrifugal device may be utilized in controlling the operation of the flow control valve 20. Alternatively, an impellor may be used to provide a pneumatic signal in response to changes in the rotational rate of the engine. In yet another alternative the sensing device may measure the rotational speed of the engine by counting the pulses in the ignition system by electronic means and generating a signal which is indicative of the rotational speed of the engine.

The signals which are indicative of the manifold vacuum and the engine rotational speed may be fed to the computing device 30 which as previously indicated is in the form of a microprocessor suitably programmed to be operative to continuously calculate the air flow from the instantaneous values of the manifold vacuum and rotational speed of the engine and any other parameter which may be sensed by way of the sensing device S3.

It will be apparent that in certain applications the gaseous fuel may be transmitted directly from the shut-off valve 14 to the flow control valve 20 by way of line 18a. However, the preferred flow control mechanism incorporates the evaporator and pressure regulator 16.

Figure 2:
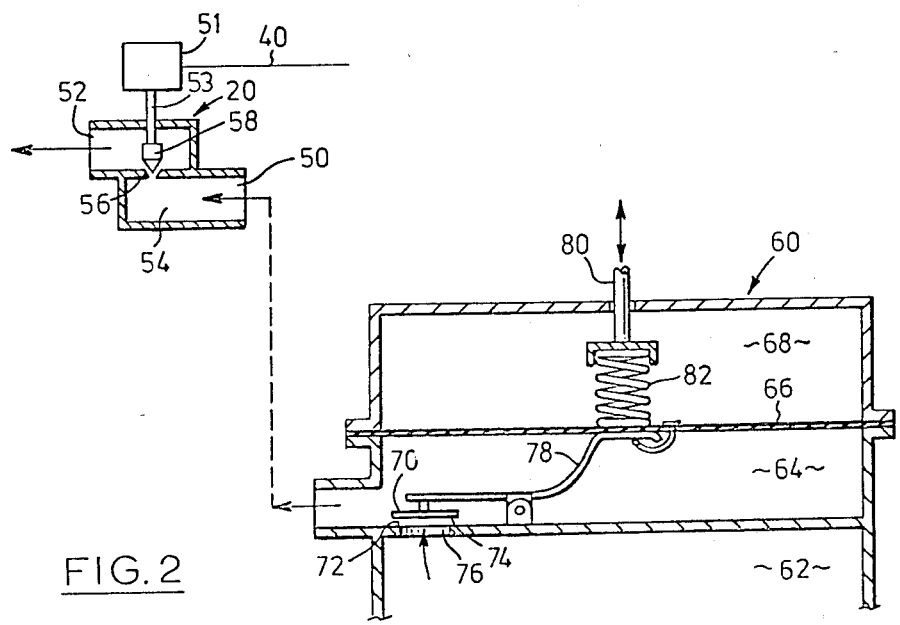
FIG. 2 is an enlarged diagrammatic view of the pressure regulator and flow control valve of FIG. 1.

The flow control valve 20 illustrated in FIG. 2 of the drawings is operative to control the flow rate of the gaseous fuel by changing the cross sectional area of the flow path through the valve in response to changes in the parameters sensed. This is achieved by providing the valve 20 which comprises a gas inlet 50 and a gas outlet 52 which communicate with one another through a flow passage 54 in which the valve seat 66 is located. The valve head 58 is mounted on a shaft 53 of a digital liner actuator 51 which receive the control signal from the computer device 30, by way of line 40, to effect movement of the head 58 toward and away from the valve seat 56. A suitable digital linear actuator is available from Philips Controls and is identified as a Series 92100 digital linear actuator. The area of the flow passage through the valve seat can be progressively changed from a fully open position to a fully closed position. To achieve this the valve head 58 is conical in shape and arranged to engage the seat at or adjacent the portion thereof of largest diameter so that progressive retraction of the head from the valve seat progressively increases the cross sectional area of the flow path through the seat. The valve head 58 is coupled to the sensing means through the computing means as previously indicated to increase the cross-sectional area of the flow passage in response to an increase in rotational speed of the engine or in response to a decrease in manifold vacuum or both.

The fuel flow control means of the perferred embodiment also includes a pressure control mechanism 60 which is arranged to receive gaseous fuel from a first stage pressure regulator chamber 62 of a conventional regulator, at a pressure which is typically about 2 p.s.i.g. The fuel pressure control regulator 60 is operative to control the pressure of gaseous fuel supplied to the inlet 50 of the flow valve 20 thereby providing an additional means for controlling the fuel flow rate. The fuel pressure control means 60 includes a pressure valve 70 which is selectively movable in response to changes in sensed parameters. The pressure valve 70 comprises a valve seat 72 and a valve head 74 arranged in the fuel gas supply passage 76. The valve head is movable to increase or decrease the pressure of gas supplied to the flow control valve 20 in response to an increase in the rotational speed of the engine and/or a decrease in the manifold vacuum.

A secondary pressure regulator chamber 64 is located within the housing 60 and receives gaseous fuel from the primary pressure regulating chamber 62 through the passage 76. A diaphragm 66 forms one wall of the secondary pressure regulator chamber 64. The chamber 68 which is separated from the secondary pressure regulating chamber 64 by the diaphragm 66 is open to atmosphere so as to be subject to atmospheric pressure. The diaphragm 66 is coupled to the valve head 74 of the pressure valve 70 by way of a rocker arm 78 such that the valve head 74 is caused to move in response to unwanted pressure fluctuations in the pressure regulating chamber 64.

The gaseous fuel flow rate is controlled by selectively applying a load to the diaphragm 66 so as to modify its operating characteristics. For example, a decrease in the manifold vacuum may be used to distort the diaphragm in a direction to open the pressure valve 70. Similarly, an increase in rotational speed of the engine may be used to produce opening of the pressure valve 70. This is achieved by providing a piston 80 on the external side of the diaphragm which is selectively movable towards and away from the diaphragm. A biasing spring 82 is disposed between the piston 80 and the diaphragm 66. The operation of the piston 80 is controlled by a signal from the computing means to move in response to changes in the rotational speed of the engine in a direction to appropriately control the operation of the pressure valve 70. For example, an increase in rotational speed of the engine may be arranged to move the piston toward the diaphragm thereby distorting the diaphragm via the biasing spring 60 to cause further opening of the pressure valve. By means of this arrangement either an increase in rotational speed of the engine or a decrease in manifold vacuum both similarly effect the pressure valve as to increase the pressure of the gaseous fuel supplied to the flow control valve 20. Similarly, in the embodiment using air flow computing means an increase in the air flow can be used to increase the gas pressure supplied to the flow valve by opening the pressure valve.

For any combination of engine rotational speed and manifold vacuum there is one value of air flow rate and the particular combination of engine speed and manifold vacuum describes the engine operation mode and determines the desired air to fuel ratio of the fuel air mixture. The relationship between rotational speed and vacuum with air flow can be determined and modified using the degree or richening or leaning of the mixture required so that the relationship between the speed and vacuum with gaseous fuel flow can be determined.

By means of the preferred form of the apparatus described above the flow rate can be controlled in any one of three ways:

1. The two sense parameters, engine rotational speed and manifold vacuum can both be used to control the flow valve means with the gaseous fuel being supplied to the flow valve means at a constant pressure by means of a pressure regulator;

2. Using both parameters to control the pressure difference across a flow valve means having a flow path of fixed size, the pressure on the outlet side of the flow valve means being substantially constant and closed to atmospheric pressure, hence only requiring the inlet pressure to the flow valve means to be controlled; or 3. Using one parameter to control the size of the opening in the flow valve means and using the other parameters to control the pressure of fuel gas supplied to the flow vave means.

It will be apparent that other parameters such as engine temperature and/or events such as engaging the starter motor, engaging a particular gear and switching on an airconditioner can be used to supplement the control of the gaseous fuel flow. The invention enables initial and rate adjustment so that it can be used with a wide variety of engines. Maximum gaseous fuel flow is determined by setting the maximum inlet pressure to the fuel flow control means and/or the maximum opening of the flow valve means.

Figure 4:
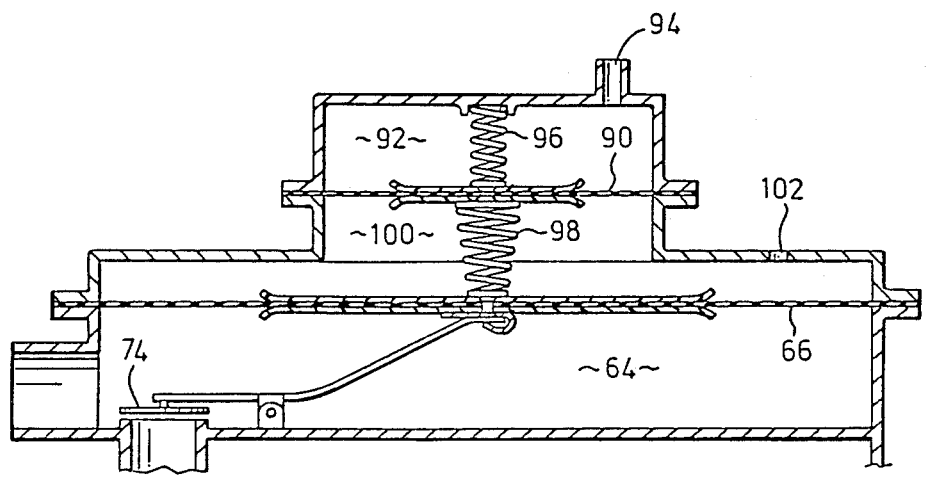
FIG. 4 is a diagrammatic sectional side view of an alternative pressure regulator.

FIG. 4 of the drawings illustrates a modified pressure regulator which differs from the regulator of FIG. 2 in that a control diaphragm 90 is provided in addition to diaphragm 66. The chamber 92 which is formed on one side of the control diaphragm 90 is adapted to be connected to the manifold vacuum through passage 94. A control compression spring 96 extends between the diphragm 90 and the adjacent wall of the chamber 92. A second stage compression spring 98 extends between the diaphragm 90 and the diaphragm 66. The chamber 100 which is formed between the diaphragm 90 and the diaphragm 66 has a vent passage 102 opening therefrom which may be connect to any other required control device. The regulator of FIG. 4 is designed to allow the outlet gas pressure to increase as the manifold vacuum decreases and vica versa. In this regard it will be apparent that when the manifold vacuum applied to the chamber 92 decreases the pressure in the chamber 92 will increase and this increase will cause the valve 74 to open. Devices such as screws may be used to limit the travel of the control diaphragm in either or both directions so as to limit the loadings on the second stage diaphragm spring 98,. The rate of either or both springs 96 and 98 may vary over the compression travel so that various relationships (i.e. not just linear) between the outlet pressure and the manifold vacuum may be achieved.

Figure 3:
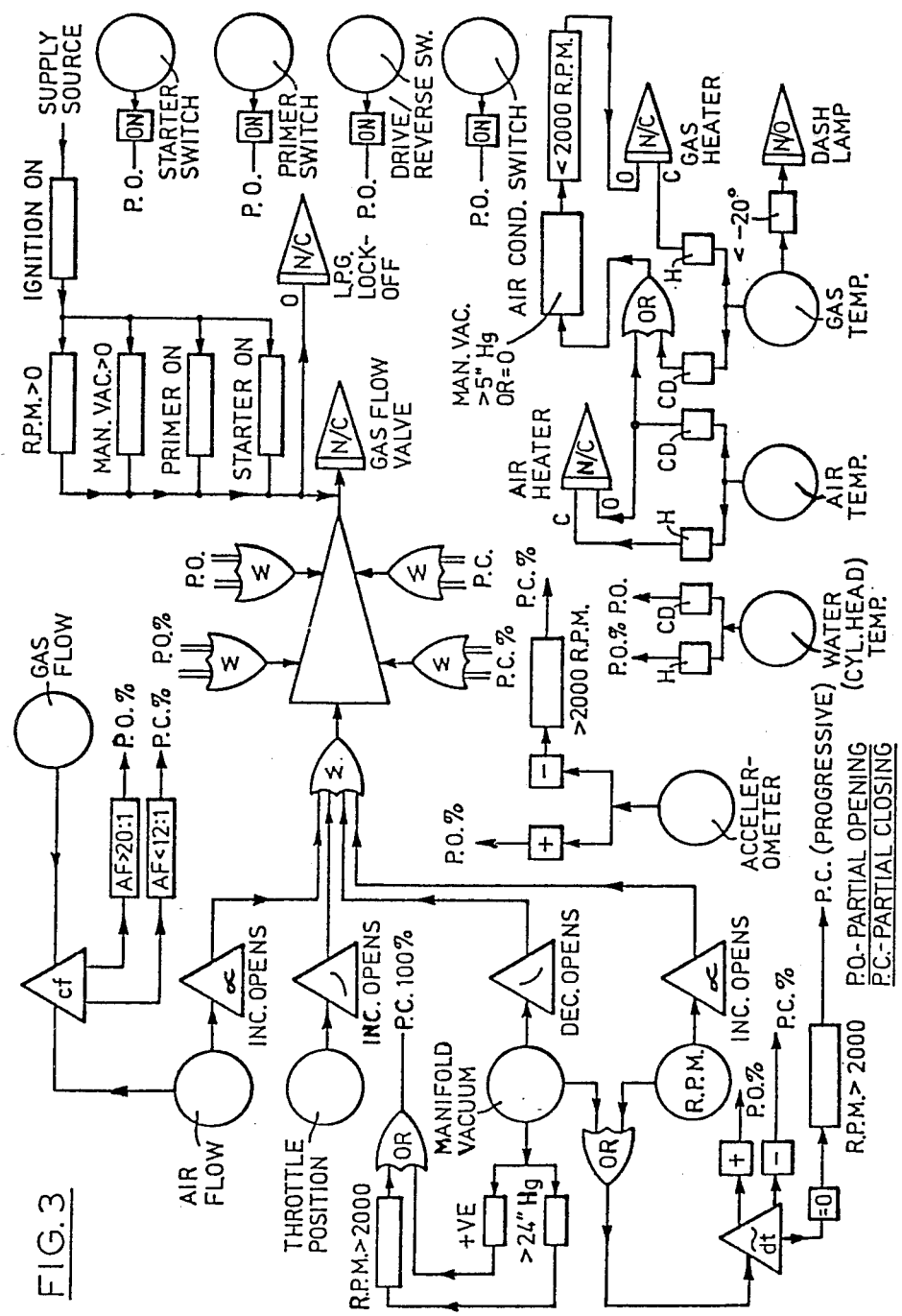
FIG. 3 is a logic diagram of an electronic mixer control system suitable for use in controlling the mixer of the present invention.

FIG. 3 is a logic diagram of an electronic mixer control system suitable for use in controlling the mixer of the present invention. From FIG. 3 it will be apparent that numerous parameters including air flow, throttle position, manifold vacuum, engine speed and gas flow may be monitored to generate sensing signals which are provided as input to the computer device. Additional, parameters which are not directly related to air flow rate but which are related to engine operating conditions may also be sensed including accelleration, water temperature, air temperature, gas temperature. Furthermore, additional parameters including the activation of the starter switch, primer switch or the operation of the gear shift mechanism or the operation of an air conditioner may be monitored to generate an additional input to the computer. In some induction systems it may be possible to directly measure the air flow. In other cases it may be preferred to use the degree of throttle opening instead of manifold vacuum as a signal source. Signals may be used to provide a step variation or percentage variation by the computing means. Typical events which may be used to modulate the computing means include engaging a transmission gear, starting an air conditioner and turning on vehicle lights. Barometric pressure, air and fuel temperatures and atmospheric humidity may be measured and computed to obtain the desired air to fuel ratio. An accelerometer or time rate of change of manifold vacuum, may be used to modulate the air to fuel ratio. A positive manifold pressure (for example, a back fire) or a very high manifold vacuum (as occurs on high-speed decelerations) may close the fuel control valve. A constant manifold pressure (as occurs on cruising) may allow the mixture to be leened out until a pre-set limit is reached, or a condition such as high engine or water temperature is reached. The air and fuel temperatures may be employed to control heaters or coolers which may utilize the atent heat of the fuel itself to vary the temperatures depending on the operating mode, for example, starting, cruising and open-throttle conditions.

From the foregoing it will be apparent that the present invention provides a method and apparatus for supplying a gaseous fuel/air mixture to an associated internal combustion engine.

The invention permits a conventional gasoline engine to be converted to a gaseous fuel engine without requiring the replacement of the carburetion system of the liquid fuel engine. Furthermore, the engine may operate on either gaseous fuel or liquid fuel. The engine is permitted to operate on liquid fuel by closing of the shut-off valve 14 and permitting the liquid fuel to be reduced into a conventional carburetor by way of line 23 as previously indicated.

By the simple expedient of sensing one operating parameter of the engine which is a function of the induction air flow rate and controlling the rate of flow of gaseous fuel in response to variations in the induction air flow rate I have provided a system which permits gaseous fuel to be supplied to the engine at the required rate. These and other advantages of the present invention will be apparent to those skilled in the art.

I claim:

1. In a gaseous fuel carburetion system in which air and gaseous fuel are mixed prior to induction into an internal combustion engine, and in which the rate of flow of the induction air is controlled by throttling the intake of the air/fuel mixture, and in which gaseous fuel is supplied to the system from a pressurized source, an improved system for regulating the supply of gaseous fuel to the engine comprising;
   (a) sensing means for sensing the speed of rotation of said engine and generating a first control signal which is a measure of the displaced volume rate of the engine in use,
   (b) sensing means for sensing the pressure in the induction manifold and generating a second control signal which is a measure of the density of the air induced by the engine which varies according to the load applied to the engine,
   (c) means for combining said first and second control signals to generate a third control signal which is measure of the amount of fuel required for optimum combustion of the measured displaced volume rate adjusted to reflect the measured air density such that said third signal varies in response to changes in the induction air flow rate,
   (d) means for controlling the rate of flow of the gaseous fuel from the source to the engine by means of said third control signal whereby the rate of flow of the gaseous fuel varies in response to the sensed changes in the parameters related to the air flow rate.

2. The improvement of claim 1 including means for regulating the pressure of the gaseous fuel supply to a predetermined pressure above the induction air pressure thereby to provide a positive pressure gaseous fuel supply.

3. The improvement of claim 1 further comprising means for selectively varying the cross-sectional area of the fuel supply passage to control the rate of flow of the gaseous fuel.

4. The improvement of claim 1 further comprising means for changing the pressure of the gaseous fuel supplied to a flow control valve in the gaseous fuel supply line to control the rate of flow of the gaseous fuel.

5. In a gaseous fuel carburetion system of an internal combustion engine having, an induction manifold, a pressure regulator, and a flow control valve and in which air and gaseous fuel are mixed prior to induction, and in which the rate of flow of the induction air is controlled by throttling the intake of the air/fuel mixture, and in which gaseous fuel is supplied to the system from a pressurized source through a pressure regulator, an improved system for regulating the supply of gaseous fuel to the engine comprising the steps of;
   (a) sensing means for sensing the speed of rotation of said engine and generating a first control signal which is a measure of the instantaneous displaced volume rate of the engine in use,
   (b) sensing means for sensing the pressure in the induction manifold and generating a second control signal which is a measure of the instantaneous density of the air induced by the engine which varies according to the load applied to the engine,
   (c) control means for controlling the pressure of the gaseous fuel discharged by the pressure regulator by means of said first signal such that it is a function of the instantaneous displaced volume rate of the engine in use,
   (d) control means controlling the the extent to which the flow control valve is opened or closed by means of said second control signal such that the opening of the flow control valve is a function of the load applied to the engine, whereby the rate of flow of the gaseous fuel varies in response to the variations in the instantaneous displaced volume rate of the engine in use according to the load applied to the engine.

6. In a gaseous fuel carburetion system of an internal combustion engine having, an induction manifold, a pressure regulator, and a flow control valve and in which air and gaseous fuel are mixed prior to induction, and in which the rate of flow of the induction air is controlled by throttling the intake of the air/fuel mixture, and in which gaseous fuel is supplied to the system from a pressurized source through a pressure regulator, an improved system for regulating the supply of gaseous fuel to the engine comprising the steps of;
  (a) sensing means for sensing the speed of rotation of said engine and generating a first control signal which is a measure of the instantaneous displaced volume rate of the engine in use,
  (b) sensing means for sensing the pressure in the induction manifold and generating a second control signal which is a measure of the instantaneous density of the air induced by the engine which varies according to the load applied to the engine,
  (c) control means controlling the pressure of the gaseous fuel discharged by the pressure regulator by means of said second control signal such that the pressure of the gaseous fuel supplied it is a function of the instantaneous displaced volume rate of the engine in use,
  (d) control means controlling the the extent to which the flow control valve is opened or closed by means of said first signal such that it is a function of the instantaneous displaced volume rate of the engine in use, whereby the rate of flow of the gaseous fuel varies in response to the variations in the instantaneous displaced volume rate of the engine in use according to the load applied to the engine.

* * * * *